E. Broad.
Cant-Hook.
Nº 73075.  Patented Jan. 7, 1868.
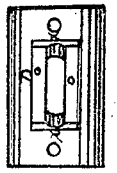
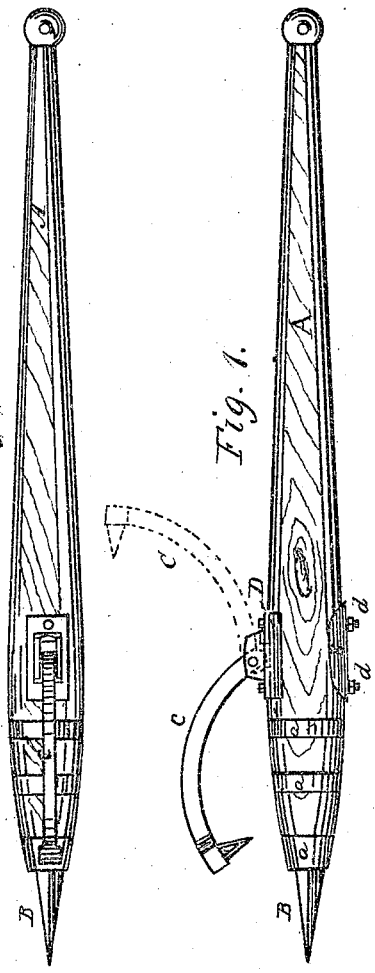
Witnesses:
Inventor:

UNITED STATES PATENT OFFICE.

ELISHA BROAD, OF ST. ANTHONY'S FALLS, MINNESOTA.

IMPROVEMENT IN CANT-HOOKS.

Specification forming part of Letters Patent No. 73,075, dated January 7, 1868; antedated July 8, 1867.

*To all whom it may concern:*

Be it known that I, ELISHA BROAD, of St. Anthony's Falls, in the county of Hennepin, and in the State of Minnesota, have invented certain new and useful Improvements in Cant-Hooks; and do hereby declare that the following is a full, clear, and exact description thereof, reference being had to the accompanying drawings, and to the letters of reference marked thereon.

In the annexed drawings, A represents a handle, which is constructed in any of the known and usual ways, and provided at one end with a four-cornered pointed spike, B. *a a* represent the ferrules or bands which slip over the end of the handle to prevent it from splitting.

C represents the hook, which has its point made round, heavy at its base, and with a sudden or short taper. The base of the point is made square, so as to prevent it from entering the log too deep and being hard to draw out.

D represents a metallic plate, which has two ears or wings, between which one end of the hook C is pivoted. A flange, as seen at *x x*, is formed across the ends of the ears *o o*, which act as stops to prevent the hook from falling too far forward or backward. Two bolts, *d d*, pass through the plate D, through the handle, and through a plate, E, and are secured by means of nuts upon their ends. By means of these bolts the plate D may be securely attached to the handle A, and may be kept confined to it, when the handle shrinks, by screwing up the nuts on bolts *d d*. The back-stop of plate D keeps the hook C in proper position for striking at the log the instrument is designed to move.

Having thus fully described my invention, what I claim as new, and desire to secure by Letters Patent, is—

The plate D, with its ears and stops *x x*, as shown and described, whereby the hook C, as constructed, is hinged to the handle A, and prevented from falling too far back or forward, substantially as herein specified.

In testimony that I claim the foregoing improvement in cant-hooks I have hereunto set my hand this 6th day of March, 1867.

ELISHA BROAD.

Witnesses:
W. H. CLARKE,
H. F. BLANCHARD.